(12) United States Patent
Mitsutake

(10) Patent No.: US 6,853,928 B1
(45) Date of Patent: Feb. 8, 2005

(54) TWO-WIRE ELECTROMAGNETIC FLOWMETER

(75) Inventor: Ichiro Mitsutake, Tokyo (JP)

(73) Assignee: Yamatake Corporation, Tokyo (JP)

( * ) Notice: Subject to any disclaimer, the term of this patent is extended or adjusted under 35 U.S.C. 154(b) by 21 days.

(21) Appl. No.: 10/631,443

(22) Filed: Jul. 30, 2003

(30) Foreign Application Priority Data

Jul. 31, 2002 (JP) ........................................ 2002-223843

(51) Int. Cl.[7] ............................. G01F 1/00; G01F 1/66; G01F 1/58
(52) U.S. Cl. ........................... 702/45; 702/46; 702/52; 73/861.08; 73/861.13
(58) Field of Search ............................ 702/45, 46, 52; 324/222, 546; 73/861.08, 861.11, 861.12, 861.13, 861.15, 861.17; 340/870.39

(56) References Cited

U.S. PATENT DOCUMENTS 5,621,177 A * 4/1997 Torimaru ................. 73/861.16

FOREIGN PATENT DOCUMENTS

| JP | 07-209049 A | 8/1995 |
|---|---|---|
| JP | 07-324959 A | 12/1995 |
| JP | 08-021754 A | 1/1996 |

* cited by examiner

Primary Examiner—John Barlow
Assistant Examiner—Meagan S Walling
(74) Attorney, Agent, or Firm—Blakely Sokoloff Taylor & Zafman

(57) ABSTRACT

In a two-wire electromagnetic flowmeter, an exciting coil generates a magnetic field in a direction perpendicular to the flowing direction of a fluid that flows through a measurement tube. A flow measuring output circuit adjusts an output current that flows to a pair of power supply lines to which an external power is supplied, in accordance with a flow measurement value obtained on the basis of a signal electromotive force which is generated in a direction perpendicular to the flowing direction of the fluid that flows through the measurement tube and the direction of the magnetic field generated from the exciting coil. An exciting circuit is connected in series with the flow measuring output circuit between the pair of power supply lines and supplies part of the output current to the exciting coil as an exciting current. In the exciting circuit, an exciting voltage circuit generates an exciting voltage between first and second lines. An exciting current adjustment circuit adjusts the value of the exciting current in accordance with the magnitude of the output current adjusted by the flow measuring output circuit. A capacitor is connected in parallel with the exciting voltage circuit between the first and second lines.

5 Claims, 6 Drawing Sheets

TWO-WIRE ELECTROMAGNETIC FLOWMETER

BACKGROUND OF THE INVENTION

The present invention relates to an electromagnetic flowmeter which measures the flow rate of a fluid having a conductivity in various process systems and, more particularly, to a two-wire electromagnetic flowmeter which outputs a measurement value by adjusting an output current flowing to a pair of power supply lines that supply an external voltage from a DC power supply.

In a conventional two-wire electromagnetic flowmeter, an exciting coil is arranged such that the generation direction of a magnetic field becomes perpendicular to the flowing direction of a fluid that flows through a measurement tube. When a rectangular-wave-shaped exciting current Iex having a predetermined frequency is supplied to the exciting coil, a signal electromotive force (a signal proportional to the flow rate) is detected, which is obtained, in accordance with the Faraday's law, between electrodes that are arranged in the measurement tube to be perpendicular to the magnetic field generated by the exciting coil. A measurement value with respect to the maximum flow rate value is obtained as a 0% to 100% value by arithmetic processing by a CPU (Central Processing Unit) on the basis of the detected signal electromotive force. A current (output current) flowing to a pair of power supply lines that supply an external voltage to the two-wire electromagnetic flowmeter is adjusted within the current range of 4 to 20 mA in accordance with the obtained measurement value.

As shown in FIG. 5, an external voltage Vs from a DC power supply 200 is supplied to a conventional two-wire electromagnetic flowmeter 100 through a pair of power supply lines L1 and L2. An external load RL (resistance: 250 Ω) is connected to the power supply line L2 (DC 24 V). In this case, the value of the external voltage Vs supplied to the two-wire electromagnetic flowmeter 100 is obtained by subtracting the voltage drop at the external load RL from the power supply voltage of the DC power supply 200.

The conventional two-wire electromagnetic flowmeter 100 is constituted by an exciting coil 2 which is arranged such that the generation direction of a magnetic field becomes perpendicular to the flowing direction of a fluid that flows through a measurement tube 1, an exciting circuit 3 which generates an exciting voltage Vex between a first line LA and a second line LB and also periodically supplies the exciting current Iex having a rectangular waveform to the exciting coil 2, detection electrodes 4a and 4b which are arranged in the measurement tube 1 to be perpendicular to a magnetic field generated by the exciting coil 2, a ground electrode 5, and a flow measuring output circuit 6 which detects a signal electromotive force obtained between the detection electrodes 4a and 4b, obtains a measurement value on the basis of the detected signal electromotive force, and adjusts an output current I (Iout) to be returned to the DC power supply 200 within the current range of 4 to 20 mA in accordance with the obtained measurement value.

The exciting circuit 3 is constituted by an exciting voltage circuit (constant voltage circuit) 3-1, D/A circuit 3-2, and exciting current adjustment circuit 3-3. The exciting voltage circuit 3-1 is constituted by a transistor Q1, comparator CP1, reference resistor Ref, Zener diode ZD1, and resistors R1 and R2. A reference voltage Vref generated at the connection point between the Zener diode ZD1 and the reference resistor Ref is compared with a detection voltage Vpv generated at the connection point between the resistors R1 and R2. The comparator CP1 controls the current flowing between the collector and the emitter of the transistor Q1 such that the reference voltage Vref matches the detection voltage Vpv. Accordingly, a constant voltage of 8.5 V is generated between the lines LA and LB as the exciting voltage Vex.

The D/A circuit 3-2 is constituted by resistors R3, R4, and R5, capacitor C1, comparator CP2, and switch SW5. One terminal of the resistor R3 is connected to the connection point between the resistors R1 and R2. The other terminal of the resistor R3 is connected to one terminal of the resistor R4 through the switch SW5. The other terminal of the resistor R4 is connected to the line LB. One terminal of the resistor R4 is connected to the non-inverting input terminal of the comparator CP2 through the resistor R5. The capacitor C1 is connected between the line LB and the non-inverting input terminal of the comparator CP2.

The exciting current adjustment circuit 3-3 is constituted by a resistor R6, transistor Q2, and switches SW1 to SW4. The output terminal of the comparator CP2 of the D/A circuit 3-2 is connected to the base of the transistor Q2. The emitter of the transistor Q2 is connected to the line LB through the resistor R6 and also connected to the inverting input terminal of the comparator CP2. The collector of the transistor Q2 is connected to the line LA through the series connection circuit of the switches SW4 and SW1 and the series connection circuit of the switches SW3 and SW2. The exciting coil 2 is connected between a connection point P1 of the switches SW1 and SW4 and a connection point P2 of the switches SW2 and SW3.

The exciting current adjustment circuit 3-3 alternately turns on the switches SW1 and SW3 and the switches SW2 and SW4 at a predetermined period in accordance with a command from the flow measuring output circuit 6, thereby generating the rectangular-wave-shaped exciting current Iex whose polarity alternately switches. The D/A circuit 3-2 ON/OFF-controls the switch SW5 in accordance with a command from a CPU 6-4 of the flow measuring output circuit 6 to switch the value (peak value) of the exciting current Iex to multiple levels in accordance with the measurement value by the flow measuring output circuit 6, as shown in FIG. 6.

The flow measuring output circuit 6 is constituted by a signal electromotive force detection circuit 6-1, a sample-and-hold circuit 6-2, an A/D conversion circuit 6-3, the CPU 6-4, a D/A conversion circuit 6-5, a current adjustment circuit (CCS) 6-6, and a constant voltage circuit 6-7 which supplies a power supply voltage to these circuits.

The signal electromotive force detection circuit 6-1 detects a signal electromotive force obtained between the electrodes 4a and 4b by using the potential of the ground electrode 5 as a reference. The sample-and-hold circuit 6-2 samples and holds the value of the signal electromotive force detected by the signal electromotive force detection circuit 6-1 immediately before the polarity switches. The A/D conversion circuit 6-3 converts the signal electromotive force (analog value) output from the sample-and-hold circuit 6-2 into a digital value and sends the digital value to the CPU 6-4.

On the basis of the signal electromotive force from the A/D conversion circuit 6-3, the CPU 6-4 obtains the measurement value (0 to 100% value) and outputs the measurement value to the D/A conversion circuit 6-5. The D/A conversion circuit 6-5 converts the measurement value (digital value) from the CPU 6-4 into an analog value and sends the analog value to the current adjustment circuit 6-6. The current adjustment circuit 6-6 has a comparator CP3, transistor Q3, and resistor R7. By causing the comparator CP3 to adjust the base current of the transistor Q3, a current Iccs that flows between the collector and the emitter of the transistor Q3 is adjusted in accordance with the measurement value from the D/A conversion circuit 6-5.

In accordance with the measurement value obtained on the basis of the signal electromotive force from the A/D conversion circuit 6-3, the CPU 6-4 gives a command to the exciting circuit 3 such that the exciting current Iex is supplied to the exciting coil 2 in accordance with the relationship shown in FIG. 6. More specifically, the CPU 6-4 issues a command to the exciting current adjustment circuit 3-3 to alternately turn on the switches SW1 and SW3 and the switches SW2 and SW4, thereby supplying the rectangular-wave-shaped exciting current Iex whose polarity alternately switches to the exciting coil 2. The CPU 6-4 outputs a command to the D/A circuit 3-2 to ON/OFF-control the switch SW5 at a duty ratio (a duty ratio which is set stepwise in accordance with the measurement value) corresponding to the measurement value, thereby adjusting the voltage value to the non-inverting input terminal of the comparator CP2. Accordingly, the value of the current flowing to the transistor Q2, i.e., the value of the exciting current Iex flowing to the exciting coil 2 is adjusted.

In the two-wire electromagnetic flowmeter 100, the exciting circuit 3 and flow measuring output circuit 6 are connected in series between the power supply lines L1 and L2. The current that flows through the exciting circuit 3 flows into the flow measuring output circuit 6 and becomes the output current Iout that is returned to the DC power supply. 200. FIG. 7 shows the simplified circuit arrangement of the two-wire electromagnetic flowmeter 100.

For example, when the measurement value by the CPU 6-4 is a 0% value, the instruction value of the exciting current Iex of the exciting coil 2 is 3.5 mA. The exciting circuit 3 requires a current of 0.5 mA to cause the exciting voltage circuit 3-1 to generate the exciting voltage Vex or set the voltage value to the non-inverting input terminal of the comparator CP2. Hence, letting Ia (0.5 mA) be the current that flows on the side of the exciting voltage circuit 3-1 including the D/A circuit 3-2, a current I1 that flows through the exciting circuit 3 is given by $$I1=Ia+Iex=0.5\ mA+3.5\ mA=4\ mA$$

The current I1 of 4 mA flows into the flow measuring output circuit 6. Let Ib be the current that flows on the side of the constant voltage circuit 6-7 of the flow measuring output circuit 6. The current Ib must have a value of 3 mA to drive the CPU 6-4 and the like. For this reason, when the current Iccs that flows on the side of the transistor Q3 is adjusted to 1 mA, a current 12 (=Iccs+Ib) that flows through the flow measuring output circuit 6 is 4 mA. The current I1 that flows through the exciting circuit 3 equals the current 12 that flows through the flow measuring output circuit 6. Hence, the output current Iout returned to the DC power supply 200 is 4 mA.

When the measurement value by the CPU 6-4 is, e.g., a 10% value, the CPU 6-4 adjusts the current Iccs that flows on the side of the transistor Q3 to 2.6 mA to set the output current Iout to 5.6 mA (−4 mA+1.6 mA). In this case, the exciting current Iex in the exciting circuit 3 is 3.5 mA. Hence, the current Ia that flows on the side of the exciting voltage circuit 3-1 including the D/A circuit 3-2 is 2.1 mA.

Next, the reason why the value of the exciting current Iex is switched to multiple levels in accordance with the measurement value will be described. The value of the exciting current Iex is switched to multiple levels in accordance with the measurement value by the CPU 6-4 on the basis of the relationship shown in FIG. 6. The scheme of switching the value of the exciting current Iex to multiple levels is called a multi-point excitation switching scheme. If the multi-point excitation switching scheme is not employed, and for example, if the value of the exciting current Iex is fixed to 3.5 mA, the magnetic flux density extending through the fluid is low, and the signal electromotive force obtained by the signal electromotive force detection circuit 6-1 is small. For this reason, the output largely fluctuates due to the influence of noise that is superposed on the electrodes 4a and 4b in accordance with the flow velocity. That is, since the ratio of noise contained in the signal electromotive force becomes high as the flow rate increases, the S/N ratio becomes low, and stable flow measurement cannot be executed.

Let e be the signal electromotive force obtained by the signal electromotive force detection circuit 6-1. The signal electromotive force e is given by $$e=k\cdot B\cdot v\cdot D$$

where k is a constant, D is the diameter of the measurement tube 1, v is the average flow velocity, and B is the generated magnetic flux density. The generated magnetic flux density B is proportional to the exciting current Iex. When the exciting current Iex is increased, the signal electromotive force e also becomes large even at the same flow velocity. In the conventional two-wire electromagnetic flowmeter 100, in accordance with the measurement value, i.e., when the output current (4 to 20 mA) corresponding to the measurement value increases, the exciting current Iex is switched to a large value by using the increase amount of the output current.

For example, when the measurement value is a 20% value, the value of the exciting current Iex is switched to 6.7 mA. More specifically, the output current Iout corresponding to the 20% value is 7.2 mA. The exciting circuit 3 requires the current Ia of 0.5 mA. Hence, a current up to 6.7 mA can be supplied as the exciting current Iex. When the measurement value is a 40% value, the value of the exciting current Iex is switched to 9.9 mA. More specifically, the output current Iout corresponding to the 40% value is 10.4 mA. The exciting circuit 3 requires the current Ia of 0.5 mA. Hence, a current up to 9.9 mA can be supplied as the exciting current Iex.

In this way, when the signal electromotive force e and the S/N ratio are increased by switching the exciting current Iex to a large value in accordance with the measurement value, stable flow measurement can be executed.

In the two-wire electromagnetic flowmeter 100, the external voltage Vs supplied from the DC power supply 200, i.e., the voltage Vs obtained by subtracting the voltage drop Iout×RL in the external load RL from the power supply voltage (DC 24 V) of the DC power supply 200 is divided to the exciting circuit 3 and flow measuring output circuit 6. For this reason, the exciting voltage Vex generated by the exciting voltage circuit 3-1 is as low as 8.5 V. The larger the value of the rectangular-wave-shaped exciting current Iex supplied to the exciting coil 2 becomes, the longer the rise time of the exciting current Iex becomes.

FIG. 8 shows the rising waveform obtained when the value of the exciting current Iex is switched to 3.5 mA, 6.7 mA, 9.9 mA, and 12 mA. When the value of the exciting current Iex is as small as 3.5 mA, the exciting current Iex immediately rises, as indicated by a waveform I in FIG. 8.

However, since the exciting voltage Vex generated by the exciting voltage circuit 3-1 does not change, the rise time becomes long, as indicated by waveforms II, III, and IV in FIG. 8, as the value of the exciting current Iex increases to 6.7 mA, 9.9 mA, and 12 mA. Accordingly, a steady-state region (a flat waveform portion after the exciting current Iex reaches a predetermined value) ta immediately before the polarity switches becomes short.

The sample-and-hold circuit 6-2 samples and holds the value of the signal electromotive force e immediately before the polarity switches. For example, the signal electromotive force e during 5 ms immediately before the polarity of the signal electromotive force e switches is sampled, and its average value is held. When the value of the exciting current Iex is 12 ma, the steady-state region ta immediately before the polarity of the exciting current Iex switches is only about 5 ms long. The obtained value of the sampled signal electromotive force e is based on the marginally stabilized exciting current Iex.

However, if the value of the exciting current Iex exceeds about 12 mA, the signal electromotive force e is sampled when the exciting current Iex is still changing. Accordingly, the flow measurement value contains an error due to, e.g., an eddy current generated in the electrodes 4a and 4b. For this reason, in the conventional two-wire electromagnetic flowmeter 100 that employs the multi-point excitation switching scheme, the limit value of the exciting current Iex that is set to multiple levels in accordance with the measurement value is set to about 12 mA. More specifically, the exciting voltage Vex is set to 8.5 V. The maximum value of the exciting current Iex is set to 12 mA. Power design is done such that the steady-state region ta corresponding to 5 ms or more can be ensured within the current range of Iex ~3.5 to 12 mA.

However, the conventional two-wire electromagnetic flowmeter 100 assumes a condition that the value of the exciting current Iex is smaller than that of the current I (=In=Iout) supplied from the DC power supply 200 (I>Iex). For this reason, the exciting current Iex is small in a low flow rate region. Flow measurement becomes unstable in the low flow rate region.

More specifically, when the value of the exciting current Iex is larger than the supplied current I, and for example, when the instruction value from the CPU 6-4 to the exciting circuit 3 at the supplied current I of 4 mA (measurement value: 0% value) is set to 4.8 mA, the exciting current adjustment circuit 3-3 controls the peak value of the exciting current Iex to 4.8 mA. On the other hand, the comparator CP1 of the exciting voltage circuit 3-1 compares the reference voltage Vref with the detection voltage Vpv and controls to keep the exciting voltage Vex at 8.5 V. When a current of several ten $\mu A$ is present, the Zener diode ZD1 generates a constant voltage.

In this case, when the rising waveform of the exciting current Iex reaches almost I=4 mA, as shown in FIG. 9, power supply starts to be short. The current to the Zener diode ZD1 decreases. Hence, the exciting voltage Vex cannot hold 8.5 V and starts to drop. As a result, the rising waveform of the exciting current Iex is abruptly rounded almost after exceeding the supplied current I. Hence, the stable region ta corresponding to 5 ms cannot be ensured.

For the above reason, in the conventional two-wire electromagnetic flowmeter 100, the value of the exciting current Iex is made smaller than that of the current I supplied from the DC power supply 200. For example, in a low flow rate region of 0% to 20% value, the value of the exciting current Iex is as small as 3.5 mA, and the magnetic flux density extending through the fluid is low. Hence, the signal electromotive force obtained by the signal electromotive force detection circuit 6-1 is small, and flow measurement is unstable.

SUMMARY OF THE INVENTION

It is an object of the present invention to provide a two-wire electromagnetic flowmeter which can increase the value of the exciting current in a low flow rate region and increase the stability of flow measurement in the low flow rate region.

In order to achieve the above object, according to the present invention, there is provided a two-wire electromagnetic flowmeter comprising an exciting coil which generates a magnetic field in a direction perpendicular to a flowing direction of a fluid that flows through a measurement tube, a flow measuring output circuit which adjusts an output current that flows to a pair of power supply lines to which an external power is supplied, in accordance with a flow measurement value obtained on the basis of a signal electromotive force which is generated in a direction perpendicular to the flowing direction of the fluid that flows through the measurement tube and the direction of the magnetic field generated from the exciting coil, and an exciting circuit which is connected in series with the flow measuring output circuit between the pair of power supply lines and supplies part of the output current to the exciting coil as an exciting current, wherein the exciting circuit comprises an exciting voltage circuit which generates an exciting voltage between first and second lines, an exciting current adjustment circuit which adjusts a value of the exciting current in accordance with a magnitude of the output current adjusted by the flow measuring output circuit, and a capacitor which is connected in parallel with the exciting voltage circuit between the first and second lines.

DESCRIPTION OF THE PREFERRED EMBODIMENT

Figure 1:
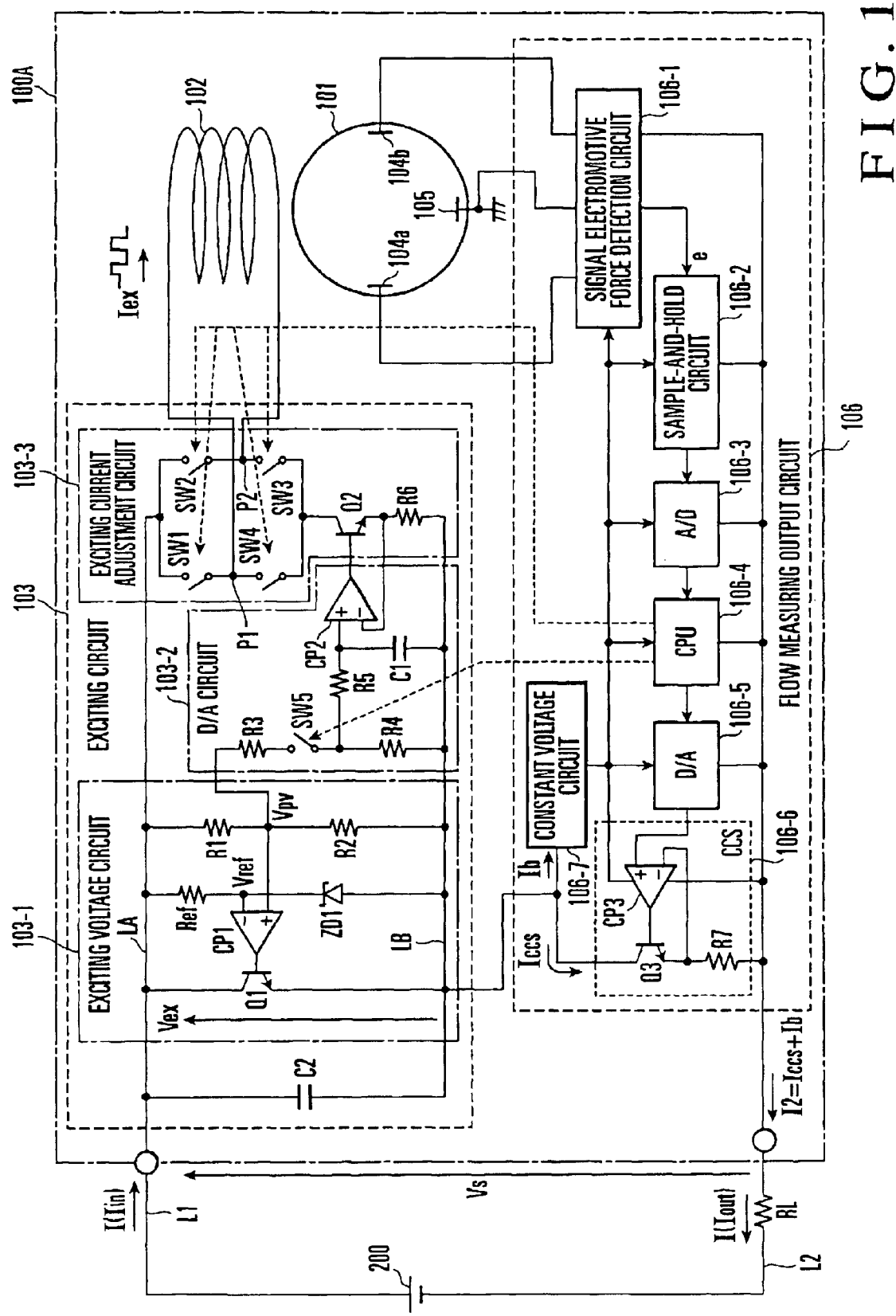
FIG. 1 is a circuit diagram showing the schematic circuit arrangement of a two-wire electromagnetic flowmeter according to an embodiment of the present invention.

FIG. 1 shows a two-wire electromagnetic flowmeter according to an embodiment of the present invention. Referring to FIG. 1, an external voltage Vs from a DC power supply 200 is supplied to a two-wire electromagnetic flowmeter 100A according to this embodiment through a pair of power supply lines L1 and L2. An external load RL (resistance: 250 Ω) is connected to the power supply line L2 (DC 24 V). In this case, the value of the external voltage Vs supplied to the two-wire electromagnetic flowmeter 100A is obtained by subtracting the voltage drop at the external load RL from the power supply voltage of the DC power supply 200.

The two-wire electromagnetic flowmeter 100A is constituted by an exciting coil 102 which is arranged such that the generation direction of a magnetic field becomes perpendicular to the flowing direction of a fluid that flows through a measurement tube 101, an exciting circuit 103 which generates an exciting voltage Vex between a first line LA and a second line LB and also periodically supplies an exciting current Iex having a rectangular waveform to the exciting coil 102, detection electrodes 104a and 104b which are arranged in the measurement tube 101 to be perpendicular to a magnetic field generated by the exciting coil 102, a ground electrode 105, and a flow measuring output circuit 106 which detects a signal electromotive force obtained between the detection electrodes 104a and 104b, obtains a measurement value on the basis of the detected signal electromotive force, and adjusts an output current I (Iout) to be returned to the DC power supply 200 within the current range of 4 to 20 mA in accordance with the obtained measurement value.

The exciting circuit 103 is constituted by an exciting voltage circuit (constant voltage circuit) 103-1, D/A circuit 103-2, and exciting current adjustment circuit 103-3. The exciting voltage circuit 103-1 is constituted by a transistor Q1, comparator Cp1, reference resistor Ref. Zener diode ZD1, and resistors R1 and R2. A reference voltage Vref generated at the connection point between the Zener diode ZD1 and the reference resistor Ref is compared with a detection voltage Vpv generated at the connection point between the resistors R1 and R2. The comparator CP1 controls the current flowing between the collector and the emitter of the transistor Q1 such that the reference voltage Vref matches the detection voltage Vpv.

Accordingly, a constant voltage of 8.5 V is generated between the lines LA and LB as the exciting voltage Vex. The D/A circuit 103-2 is constituted by resistors R3, R4, and R5, capacitor C1, comparator CP2, and switch SW5. One terminal of the resistor R3 is connected to the connection point between the resistors R1 and R2. The other terminal of the resistor R3 is connected to one terminal of the resistor R4 through the switch SW5. The other terminal of the resistor R4 is connected to the line LB. One terminal of the resistor R4 is connected to the non-inverting input terminal of the comparator CP2 through the resistor R5. The 1.5 capacitor C1 is connected between the line LB and the non-inverting input terminal of the comparator CP2.

The exciting current adjustment circuit 103-3 is constituted by a resistor R6, transistor Q2, and switches SW1 to SW4. The output terminal of the comparator CP2 of the D/A circuit 103-2 is connected to the base of the transistor Q2. The emitter of the transistor Q2 is connected to the line LB through the resistor R6 and also connected to the inverting input terminal of the comparator CP2. The collector of the transistor Q2 is connected to the line LA through the series connection circuit of the switches SW4 and SW1 and the series connection circuit of the switches SW3 and SW2. The exciting coil 102 is connected between a connection point P1 of the switches SW1 and SW4 and a connection point P2 of the switches SW2 and SW3.

Figure 2:
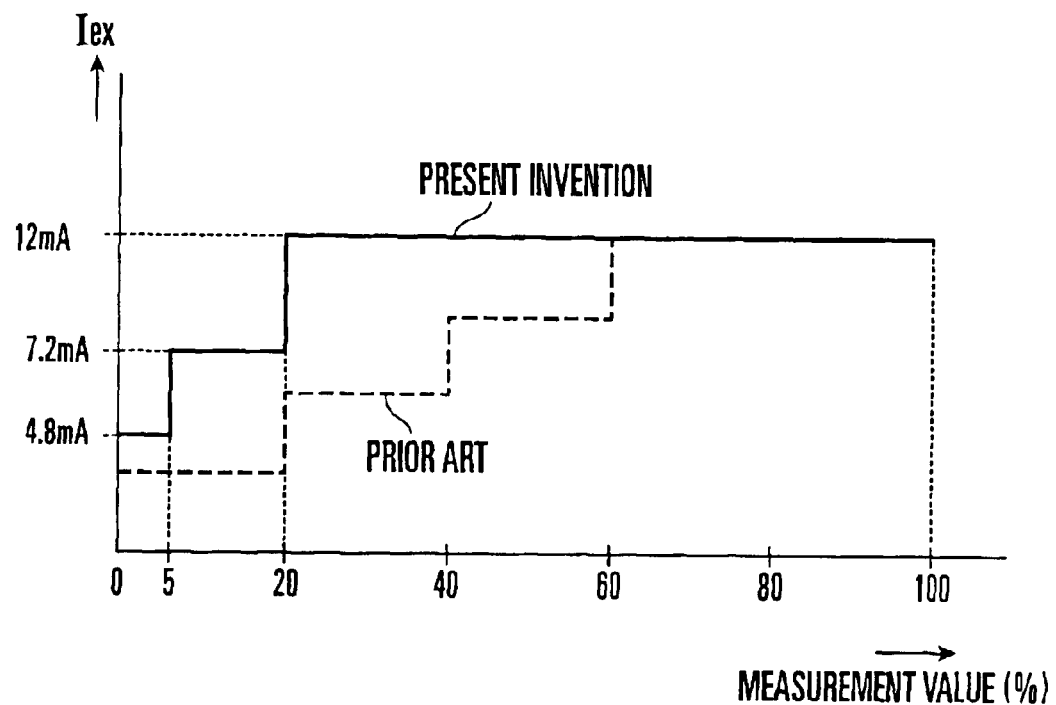
FIG. 2 is a graph showing the instruction values of an exciting current Iex corresponding to measurement values in the two-wire electromagnetic flowmeter shown in FIG. 1.

The exciting current adjustment circuit 103-3 alternately turns on the switches SW1 and SW3 and the switches SW2 and SW4 at a predetermined period in accordance with a command from the flow measuring output circuit 106, thereby generating the rectangular-wave-shaped exciting current Iex whose polarity alternately switches. The D/A circuit 103-2 ON/OFF-controls the switch SW5 in accordance with a command from a CPU 106-4 of the flow measuring output circuit 106 to switch the value (peak value) of the exciting current Iex to multiple levels in accordance with the measurement value by the flow measuring output circuit 106, as shown in FIG. 2.

The flow measuring output circuit 106 is constituted by a signal electromotive force detection circuit 106-1, a sample-and-hold circuit 106-2, an A/D conversion circuit 106-3, the CPU 106-4 serving as an instruction means, a D/A conversion circuit 106-5, a current adjustment circuit (CCS) 106-6, and a constant voltage circuit 106-7 which supplies a power supply voltage to these circuits.

The signal electromotive force detection circuit 106-1 detects a signal electromotive force obtained between the electrodes 104a and 104b by using the potential of the ground electrode 105 as a reference. The sample-and-hold circuit 106-2 samples and holds the value of the signal electromotive force detected by the signal electromotive force detection circuit 106-1 immediately before the polarity switches. The A/D conversion circuit 106-3 converts the signal electromotive force (analog value) output from the sample-and-hold circuit 106-2 into a digital value and sends the digital value to the CPU 106-4.

On the basis of the signal electromotive force from the A/D conversion circuit 106-3, the CPU 106-4 obtains the measurement value (0% to 100% value) and outputs the measurement value to the D/A conversion circuit 106-5. The D/A conversion circuit 106-5 converts the measurement value (digital value) from the CPU 106-4 into an analog value and sends the analog value to the current adjustment circuit 106-6. The current adjustment circuit 106-6 has a comparator CP3, transistor Q3, and resistor R7. By causing the comparator CP3 to adjust the base current of the transistor 03, a current Iccs that flows between the collector and the emitter of the transistor Q3 is adjusted in accordance with the measurement value from the D/A conversion circuit 106-5.

In accordance with the measurement value obtained on the basis of the signal electromotive force from the A/D conversion circuit 106-3, the CPU 106-4 gives a command to the exciting circuit 103 such that the exciting current Iex is supplied to the exciting coil 102 in accordance with the relationship shown in FIG. 2. More specifically, the CPU 106-4 issues a command to the exciting current adjustment circuit 103-3 to alternately turn on the switches SW1 and SW3 and the switches SW2 and SW4, thereby supplying the rectangular-wave-shaped exciting current Iex whose polarity alternately switches to the exciting coil 102.

The CPU 106-4 outputs a command to the D/A circuit 103-2 to ON/OFF-control the switch SW5 at a duty ratio (a duty ratio which is set stepwise in accordance with the measurement value) corresponding to the measurement value, thereby adjusting the voltage value to the non-inverting input terminal of the comparator CP2. Accordingly, the value of the current flowing to the transistor Q2, i.e. the value of the exciting current Iex flowing to the exciting coil 102 is adjusted.

The two-wire electromagnetic flowmeter 100A also comprises a capacitor C2 having a capacitance of several hundred μF or more, which is connected between the lines LA and LB on the input side of the exciting voltage circuit 103-1 of the exciting circuit 103. The capacitor C2 only needs to be connected in parallel with the exciting voltage circuit between the lines LA and LB. The capacitor C2 may be connected between the lines LA and LB on the output side of the exciting voltage circuit 103-1.

In accordance with the measurement value obtained on the basis of the signal electromotive force from the A/D conversion circuit 106-3, the CPU 106-4 issues a command to the exciting circuit 103 such that a current having a value determined by the relationship shown in FIG. 2 is set as the exciting current Iex. More specifically, the CPU 106-4 sends a command to the exciting circuit 103 such that the value of the exciting current Iex is set to 4.8 mA in the interval where the measurement value ranges from a 0% value (inclusive) to a 5% value (exclusive), 7.2 mA in the interval where the measurement value ranges from the 5% value (inclusive) to a 20% value (exclusive), and 12 mA in the interval where the measurement value ranges from the 20% value (inclusive) to a 100% value (inclusive).

Figure 4:
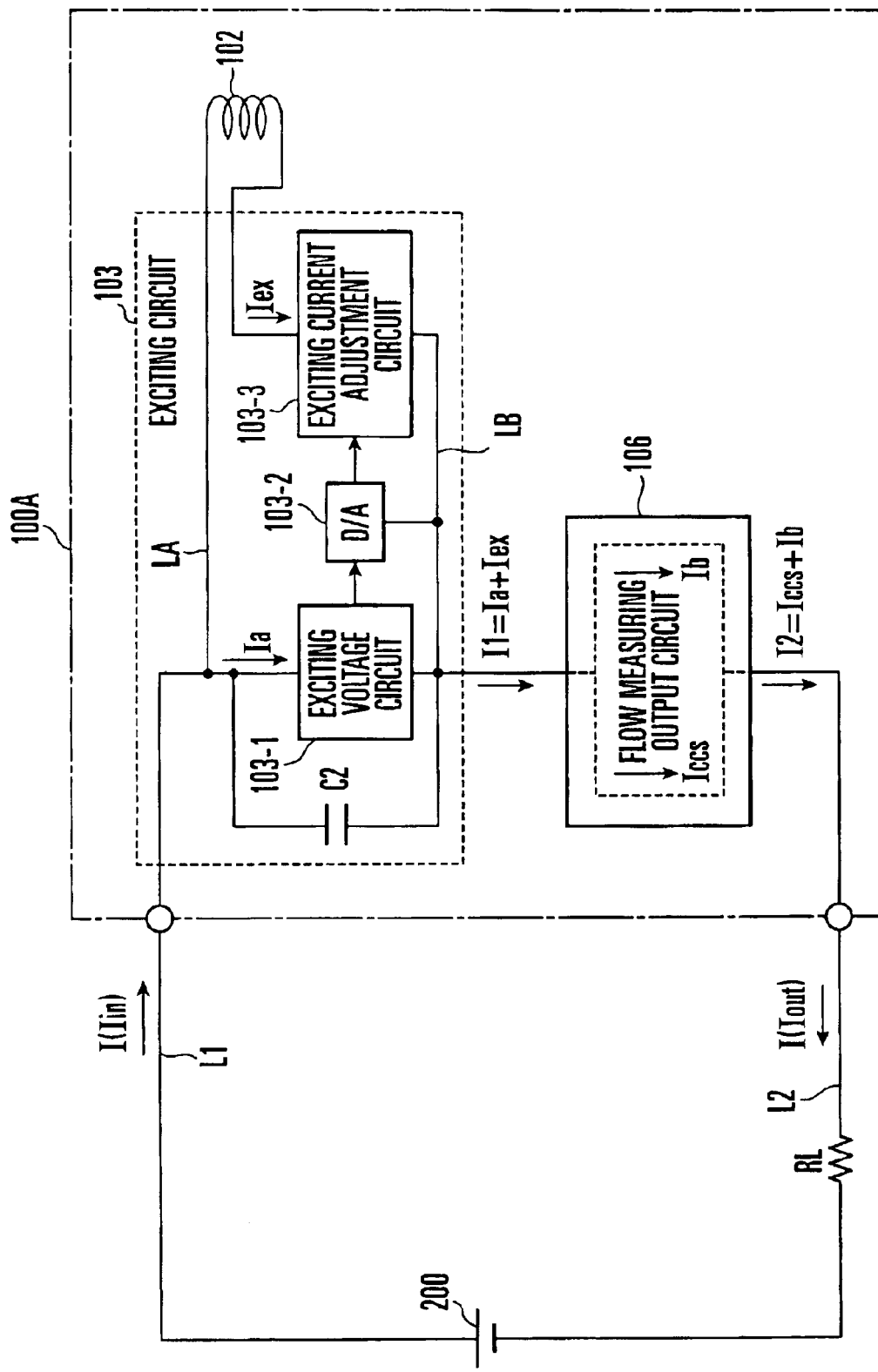
FIG. 4 is a circuit diagram showing the simplified circuit arrangement of the two-wire electromagnetic flowmeter shown in FIG. 1.
Figure 5:
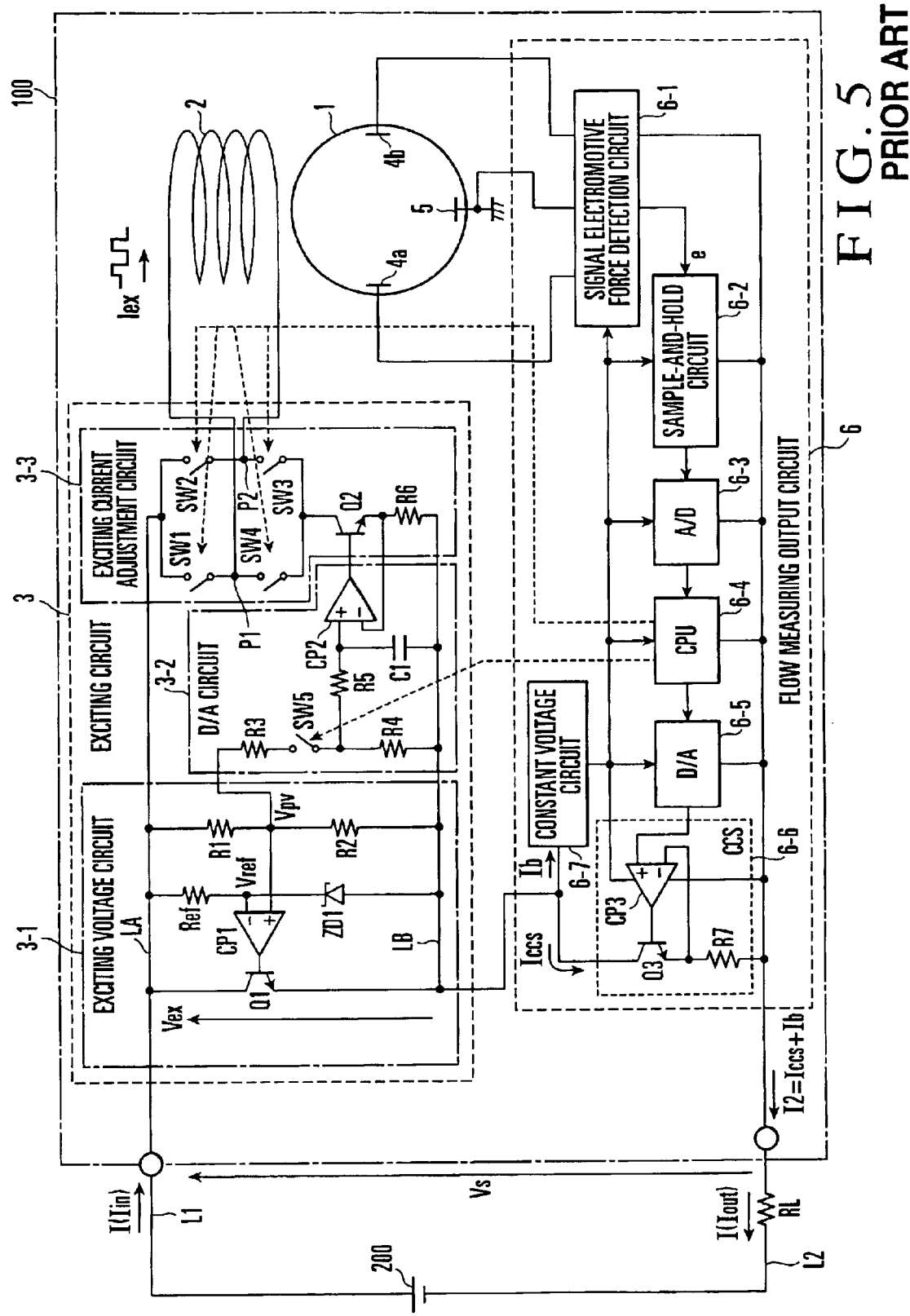
FIG. 5 is a circuit diagram showing the schematic circuit arrangement of a conventional two-wire electromagnetic flowmeter.
Figure 6:
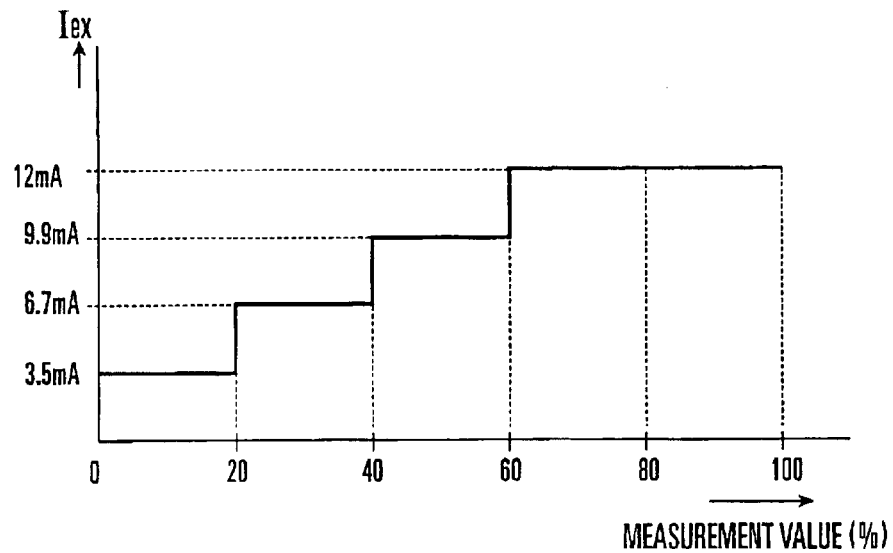
FIG. 6 is a graph showing the relationship between the measurement value and the instruction value of the exciting current Iex in the two-wire electromagnetic flowmeter shown in FIG. 5.

Even in the two-wire electromagnetic flowmeter 100A according to this embodiment, the exciting circuit 103 and flow measuring output circuit 106 are connected in series between the power supply lines L1 and L2, as in the conventional two-wire electromagnetic flowmeter 100. The current that flows through the exciting circuit 103 flows into the flow measuring output circuit 106 and becomes an output current Iout returned to the DC power supply 200. FIG. 4 shows the simplified circuit arrangement of the two-wire electromagnetic flowmeter 100A.

Figure 7:
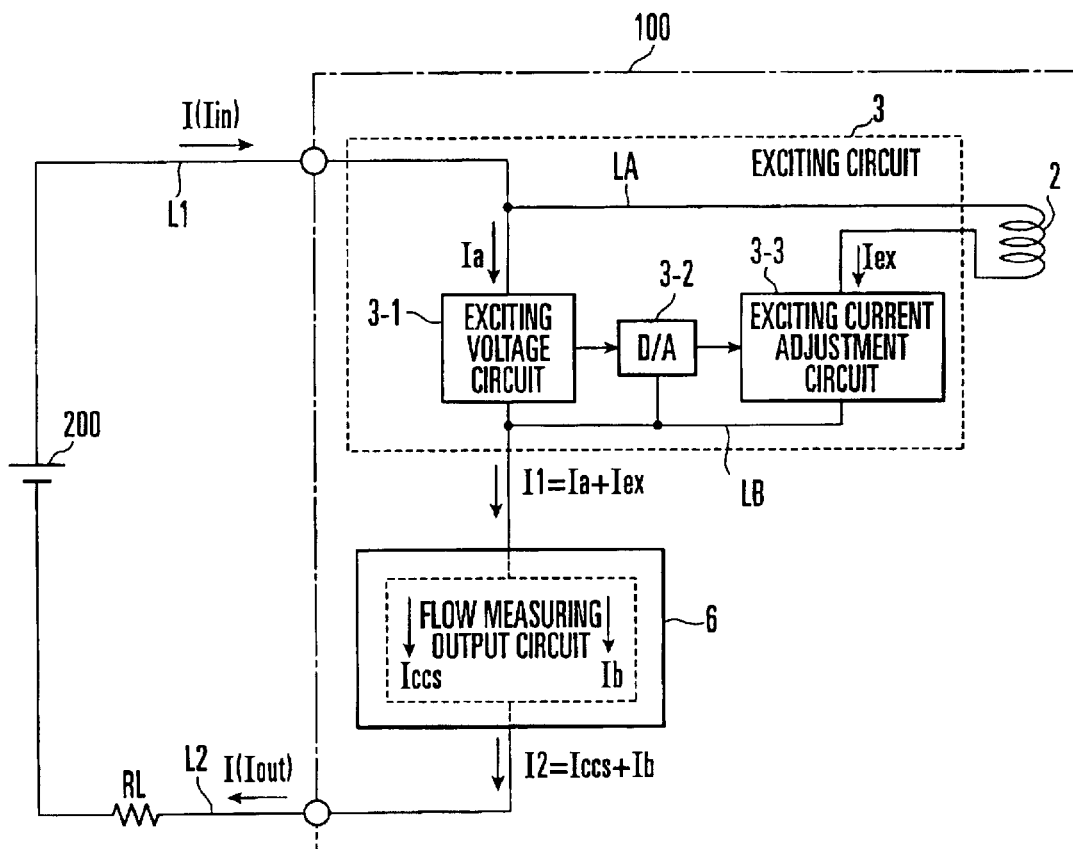
FIG. 7 is a circuit diagram showing the simplified circuit arrangement of the two-wire electromagnetic flowmeter shown in FIG. 5.
Figure 8:
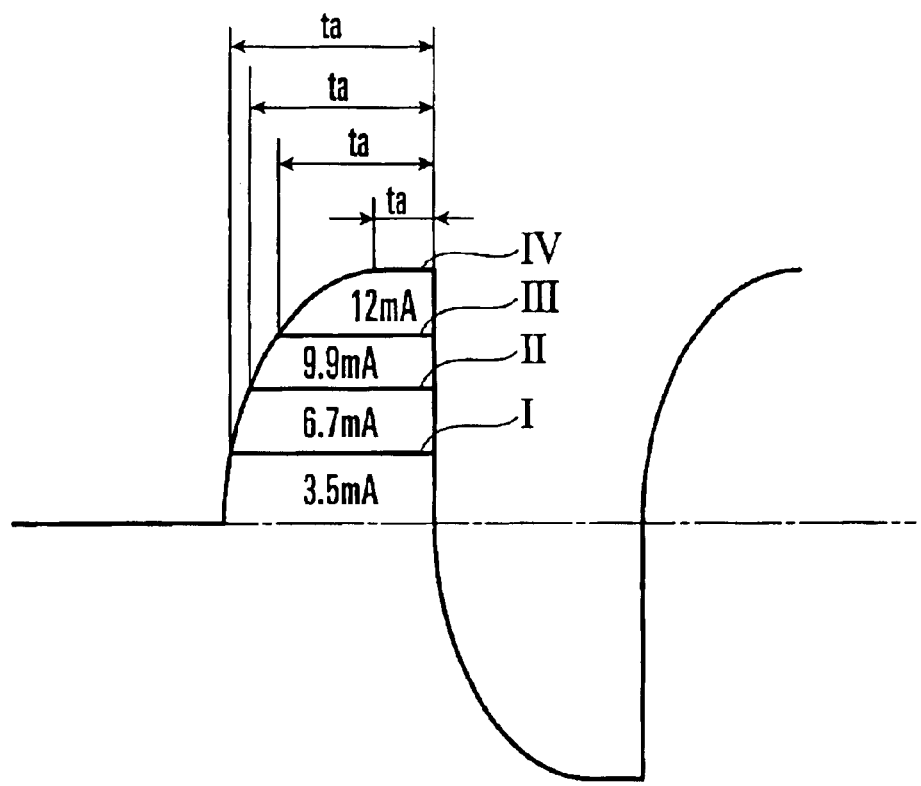
FIG. 8 is a graph showing a rising waveform obtained when the value of the exciting current Iex is switched to 3.5 mA, 6.7 mA, 9.9 mA, and 12 mA in the two-wire electromagnetic flowmeter shown in FIG. 5.

As is apparent from comparison between the circuits shown in FIGS. 4 and 7, the two-wire electromagnetic flowmeter 100A according to this embodiment is simply improved by only adding the capacitor C2 between the lines LA and LB of the exciting circuit 3.

[Interval Where Measurement Value Ranges from 0% Value (Inclusive) to 5% Value (Exclusive)]

When the measurement value ranges from the 0% value (inclusive) to the 5% value (exclusive), the CPU 106-4 of the flow measuring output circuit 106 instructs the exciting circuit 103 to set the value of the exciting current Iex to 4.8 mA in accordance with the relationship shown in FIG. 2. More specifically, the CPU 106-4 gives a value larger than the supplied current I=4 mA obtained when the measurement value is the 0% value to the exciting circuit 103 as the instruction value of the exciting current Iex until immediately before the measurement value reaches the 5% value from the 0% value.

In this example, the supplied current I when the measurement value is the 5% value is 4.8 mA. Hence, a value larger than the supplied current I at that time is given to the exciting circuit 103 as the instruction value of exciting current Iex in the whole interval immediately before the measurement value reaches the 5% value from the 0% value.

For example, assume that the measurement value is the 0% value currently, and the output current Iout, i.e., the supplied current I is 4 mA. In this case, the CPU 106-4 instructs the exciting circuit 103 to set the value of the exciting current Iex to 4.8 mA in accordance with the relationship shown in FIG. 2. Accordingly, the switch SW5 of the D/A circuit 103-2 is ON/OFF-controlled so that the value of the current that flows to the transistor Q2 of the exciting current adjustment circuit 103-3, i.e., the value of the exciting current Iex that flows to the exciting coil 102 is set to 4.8 mA, i.e., larger than the supplied current I=4 mA at that time.

Figure 3:
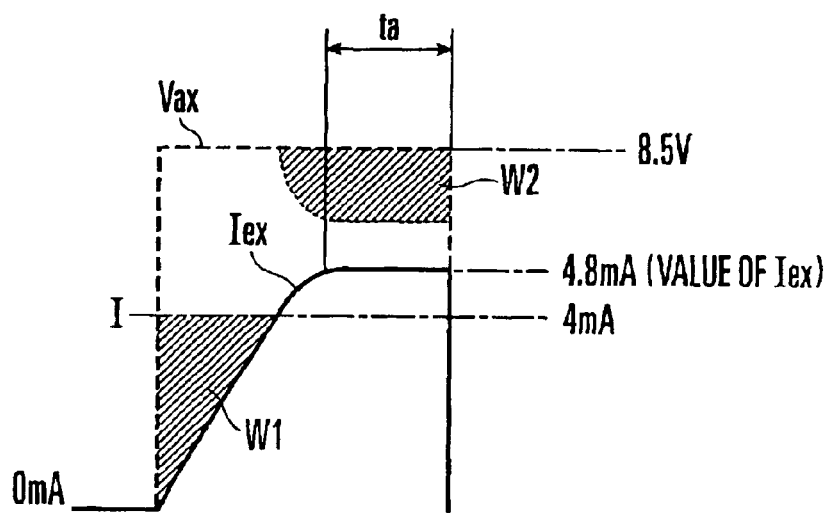
FIG. 3 is a graph showing an exciting voltage Vex and the rising waveform of the exciting current Iex at a measurement value of 0% value when the instruction value of the exciting current Iex for a measurement value of 0% value (inclusive) to 5% value (exclusive) is set to 4.8 mA in the two-wire electromagnetic flowmeter shown in FIG. 1.
Figure 9:
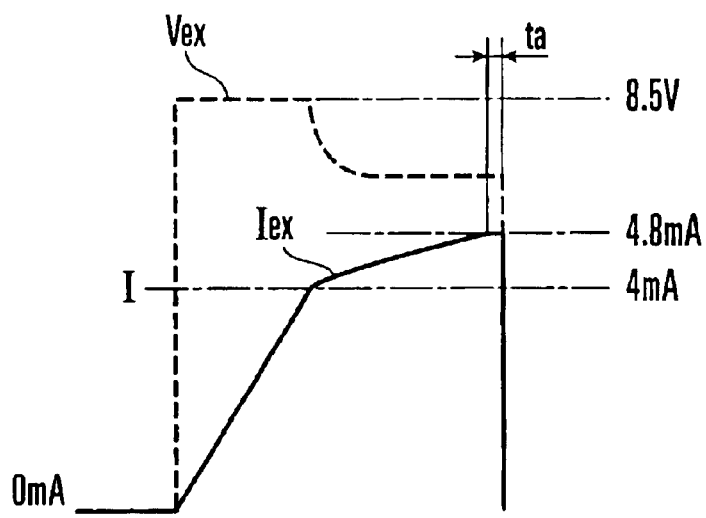
FIG. 9 is a graph showing an exciting voltage Vex and the rising waveform of the exciting current Iex at a measurement value of 0% value when the instruction value of the exciting current Iex for a measurement value of 0% value (inclusive) to 5% value (exclusive) is set to 4.8 mA in the two-wire electromagnetic flowmeter shown in FIG. 5.

At this time, the rising waveform of the exciting current Iex is not equal to the waveform shown in FIG. 9 but can ensure a steady-state region ta corresponding to 5 ms or more, as shown in FIG. 3. The rising waveform of the exciting current Iex at this time will be described. Before the rising waveform of the exciting current Iex exceeds the supplied current I=4 mA, a designed extra power indicated by a hatched portion W1 in FIG. 3 is present. Charges are accumulated in the capacitor C2 by the extra power W1.

When the rising waveform of the exciting current Iex exceeds the supplied current I=4 mA, the current to the Zener diode ZD1 decreases, and the exciting voltage. Vex generated by the exciting voltage circuit 103-1 is going to drop. At this time, since an additional current is supplied to the Zener diode ZD1 by the charges accumulated in the capacitor C2, the drop in exciting voltage Vex is suppressed, or the exciting voltage Vex is kept at a predetermined value without dropping. Accordingly, the rising waveform of the exciting current Iex is not abruptly rounded even after exceeding the supplied current I=4 mA, and the sufficiently long steady-state region ta is ensured. A hatched portion W2 in FIG. 3 indicates a power additionally supplied by the charges accumulated in the capacitor C2.

A case wherein the measurement value is the 0% value has been described above. The same operation as described above is executed in the whole interval immediately before the measurement value reaches the 5% value. Accordingly, in the whole interval where the measurement value ranges from the 0% value (inclusive) to the 5% value (exclusive), the rising waveform of the exciting current Iex which ensures the steady-state region ta corresponding to 5 ms or more can be obtained.

[Interval Where Measurement Value Ranges from 5% Value (Inclusive) to 20% Value (Exclusive)]

When the measurement value ranges from the 5% value (inclusive) to the 20% value (exclusive), the CPU 106-4 of the flow measuring output circuit 106 instructs the exciting circuit 103 to set the value of the exciting current Iex to 7.2 mA in accordance with the relationship shown in FIG. 2. More specifically, the CPU 106-4 gives a value larger than the supplied current I=4.8 mA obtained when the measurement value is the 5% value to the exciting circuit 103 as the instruction value of the exciting current Iex until immediately before the measurement value reaches the 20% value from the 5% value.

In this example, the supplied current I when the measurement value is the 20% value is 7.2 mA. Hence, a value larger than the supplied current I at that time is given to the exciting circuit 103 as the instruction value of exciting current Iex in the whole interval immediately before the measurement value reaches the 20% value from the 5% value.

For example, a case wherein the measurement value is the 5% value, and the output current Iout, i.e., the supplied current I is 4.8 mA will be described. The CPU 106-4 instructs the exciting circuit 103 to set the value of the exciting current Iex to 7.2 mA in accordance with the relationship shown in FIG. 2.

In this case, charges are accumulated in the capacitor C2 by an extra power until the rising waveform of the exciting current Iex exceeds the supplied current I=4.8 mA. While the exciting current Iex exceeds the supplied current I=4.8 mA, the current to the Zener diode ZD1 is compensated for by the charges removed from the capacitor C2. Hence, the drop in exciting voltage Vex is suppressed, or the exciting voltage Vex is kept at a predetermined value without dropping. Accordingly, the rising waveform of the exciting current Iex is not abruptly rounded even after exceeding the supplied current I=4.8 mA, and the sufficiently long steady-state region ta is ensured.

A case wherein the measurement value is the 5% value has been described above. The same operation as described above is executed in the whole interval immediately before the measurement value reaches the 20% value. Accordingly, in the whole interval where the measurement value ranges from the 5% value (inclusive) to the 20% value (exclusive), the rising waveform of the exciting current Iex which ensures the steady-state region ta corresponding to 5 ms or more can be obtained.

[Interval Where Measurement Value Ranges from 20% Value (Inclusive) to 100% Value (Inclusive)]

When the measurement value ranges from the 20% value (inclusive) to the 100% value (inclusive), the CPU 106-4 of the flow measuring output circuit 106 controls the value of the exciting current Iex to 12 mA in accordance with the relationship shown in FIG. 2. More specifically, the CPU 106-4 gives a value larger than the supplied current I=7.2 mA obtained when the measurement value is the 20% value to the exciting circuit 103 as the instruction value of the exciting current Iex until the measurement value reaches the 100% value from the 20% value.

In this example, the supplied current I when the measurement value is the 50% value is 12 mA. Hence, a value larger than the supplied current I at that time is given to the exciting circuit 103 as the instruction value of exciting current Iex in the interval immediately before the measurement value reaches the 50% value from the 20% value. In the interval where the measurement value ranges from the 50% value to the 100% value, a value smaller than the supplied current I at that time is given to the exciting circuit 103 as the instruction value of the exciting current Iex.

For example, a case wherein the measurement value is the 20% value, and the output current Iout, i.e., the supplied current I is 7.2 mA will be described. The CPU 106-4 instructs the exciting circuit 103 to set the value of the exciting current Iex to 12 mA in accordance with the relationship shown in FIG. 2.

In this case, charges are accumulated in the capacitor C2 by an extra power until the rising waveform of the exciting current Iex exceeds the supplied current I=7.2 mA. While the exciting current Iex exceeds the supplied current I=7.2 mA, the current to the Zener diode ZD1 is additionally supplied (compensated for) by the charges removed from the capacitor C2. Hence, the drop in exciting voltage Vex is suppressed, or the exciting voltage Vex is kept at a predetermined value without dropping. Accordingly, the rising waveform of the exciting current Iex is not abruptly rounded even after exceeding the supplied current I=7.2 mA, and the sufficiently long steady-state region ta is ensured.

A case wherein the measurement value is the 20% value has been described above. The same operation as described above is executed in the whole interval immediately before the measurement value reaches the 50% value. Accordingly, in the interval where the measurement value ranges from the 20% value (inclusive) to the 50% value (exclusive), the rising waveform of the exciting current Iex which ensures the steady-state region ta corresponding to 5 ms or more can be obtained.

After the measurement value reaches the 50% value, a value smaller than the supplied current I at that time is output to the exciting circuit 103 as the instruction value. Hence, the current to the Zener diode ZD1 does not decrease. The exciting voltage Vex is kept at a predetermined value even without supplying an additional current by the charges accumulated in the capacitor C2. The value of the exciting current Iex in this interval is sufficiently as large as 12 mA, so the stability of flow measurement is ensured.

According to this embodiment, the value of the exciting current Iex in the low flow rate region can be increased, and the stability of flow measurement in the low flow rate region can be increased.

In the above-described embodiment, in the whole interval where the measurement value ranges from the 0% value (inclusive) to the 5% value (exclusive) or the whole interval where the measurement value ranges from the 5% value (inclusive) to the 20% value (exclusive), a value larger than the supplied current I at that time is set as the instruction value of the exciting current Iex. The instruction value of the exciting current Iex need not always be larger than the supplied current I at that time in these whole intervals. For example, the instruction value of the exciting current Iex may be 4.8 mA in the interval where the measurement value ranges from the 0% value to the 10% value, or 7.2 mA in the interval where the measurement value ranges from the 5% value to the 30% value.

As has been described above, according to the present invention, when the value of the exciting current Iex to the exciting coil is set to be larger than the supplied current I at that time (I<Iex), charges are accumulated in the capacitor connected between the first and second lines by a designed extra power until the rising waveform of the exciting current Iex exceeds the supplied current I. The current to exciting voltage circuit is compensated for by the charges accumulated in the capacitor while the rising waveform of the exciting current Iex exceeds the supplied current I. Hence, the drop in exciting voltage Vex is suppressed, or the exciting voltage Vex is kept at a predetermined value without dropping.

Consequently, the rising waveform of the exciting current Iex is not abruptly rounded even after exceeding the supplied current I, and the sufficiently long steady-state region is ensured. Accordingly, the value of the exciting current in the low flow rate region can be increased, and the stability of flow measurement in the low flow rate region can be increased.

What is claimed is:

1. A two-wire electromagnetic flowmeter comprising:
   an exciting coil which generates a magnetic field in a direction perpendicular to a flowing direction of a fluid that flows through a measurement tube;
   a flow measuring output circuit which adjusts an output current that flows to a pair of power supply lines to which an external power is supplied, in accordance with a flow measurement value obtained on the basis of a signal electromotive force which is generated in a direction perpendicular to the flowing direction of the fluid that flows through the measurement tube and the direction of the magnetic field generated from said exciting coil; and
   an exciting circuit which is connected in series with said flow measuring output circuit between the pair of power supply lines and supplies part of the output current to said exciting coil as an exciting current, wherein said exciting circuit comprises an exciting voltage circuit which generates an exciting voltage between first and second lines, an exciting current adjustment circuit which adjusts a value of the exciting current in accordance with a magnitude of the output current adjusted by said flow measuring output circuit, and a capacitor which is connected in parallel with said exciting voltage circuit between the first and second lines.

2. A flowmeter according to claim 1, wherein said flowmeter further comprises a switch circuit which periodically switches a polarity of the exciting voltage from said exciting voltage circuit and applies the exciting voltage to said exciting coil, and said exciting current adjustment circuit is connected in series with said exciting coil between the first and second lines through said switch circuit.

3. A flowmeter according to claim 1, wherein said flowmeter further comprises instruction means for instructing the value of the exciting current in accordance with the magnitude of the output current adjusted by said flow measuring output circuit, said instruction means instructs, as the value of the exciting current, a value larger than a minimum value of the output current adjusted by said flow measuring output circuit in an interval where the flow measurement value ranges from 0 to a predetermined value, and said exciting current adjustment circuit adjusts the value of the exciting current in accordance with the instruction value given by said instruction means.

4. A flowmeter according to claim 1, wherein said capacitor is charged with an extra power before the exciting current exceeds a supplied current, and after the exciting current from said exciting voltage circuit exceeds the supplied current, the exciting current is compensated for by charges removed from said capacitor.

5. A flowmeter according to claim 1, wherein said capacitor has a capacitance value of not less than several hundred $\mu$F.

* * * * *